United States Patent [19]

Anderson

[11] 4,340,240
[45] Jul. 20, 1982

[54] THREE POINT HITCH ADAPTOR FOR A TRACTOR

[76] Inventor: Ernest L. Anderson, 85115 Florence Rd., Eugene, Oreg. 97405

[21] Appl. No.: 118,110

[22] Filed: Feb. 4, 1980

[51] Int. Cl.³ .......................................... B60D 1/000
[52] U.S. Cl. ........................ 280/461 A; 280/415 A; 280/497; 414/703
[58] Field of Search .......... 280/456 A, 456 R, 460 A, 280/460 R, 461 A, 461 R, 415; 414/703

[56] References Cited

U.S. PATENT DOCUMENTS

| | | | |
|---|---|---|---|
| 2,707,643 | 5/1955 | Nelson | 280/456 A |
| 2,838,327 | 6/1958 | Collins | 280/491 A |
| 3,427,046 | 2/1969 | Sommer | 280/461 A |
| 3,572,759 | 3/1971 | Baugh | 280/461 A |
| 3,716,253 | 2/1973 | Gniffke | 280/415 A |
| 4,002,147 | 1/1977 | Feterl | 414/703 |
| 4,059,283 | 11/1977 | Shelton | 280/461 A |
| 4,091,947 | 5/1978 | Fischer | 414/703 |
| 4,245,458 | 1/1981 | Smith | 280/456 A |

Primary Examiner—Robert R. Song
Assistant Examiner—M. J. Hill
Attorney, Agent, or Firm—James D. Givnan, Jr.

[57] ABSTRACT

An adaptor for attachment to the three point hitch of a tractor enabling attachment of various implements regardless of implement attachment point spacing. A base member adjustably carries coupling means at its lower sides positionable to coincide with the spacing of the implement attachment points. A vertically positionable hook receives the attachment pin carried at the top of the implement A-frame. Locks automatically confine the implement attachment points against dislodgement. A lock control enables lock release from the tractor driver's station. A hydraulic cylinder is in inclined, intercoupled relationship with the adaptor and tractor to impart both upward and downward powered movement to the adaptor. Lift forks may be attached to the adaptor. Ball hitch members on the adaptor enable towing of various types of trailers.

2 Claims, 6 Drawing Figures

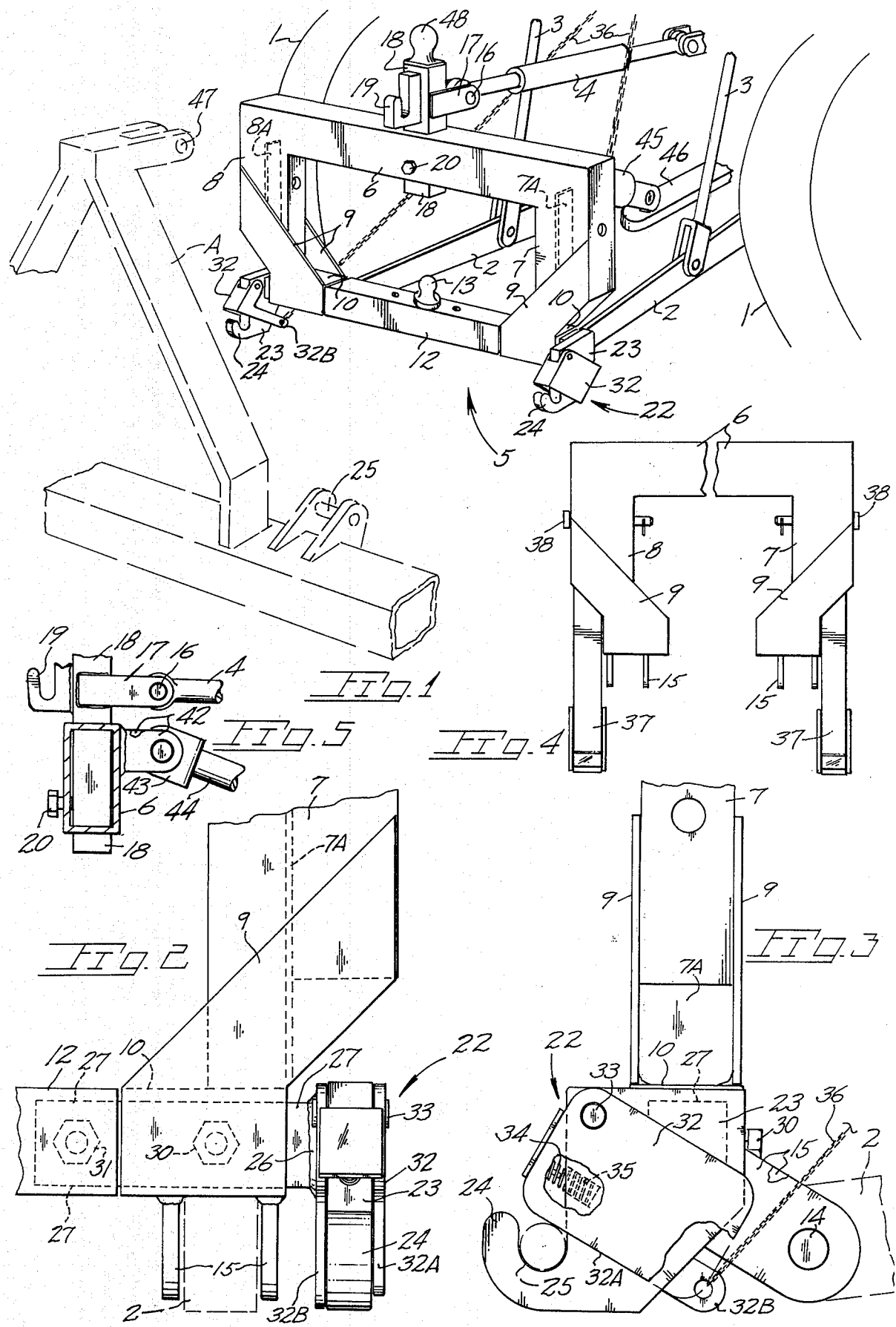

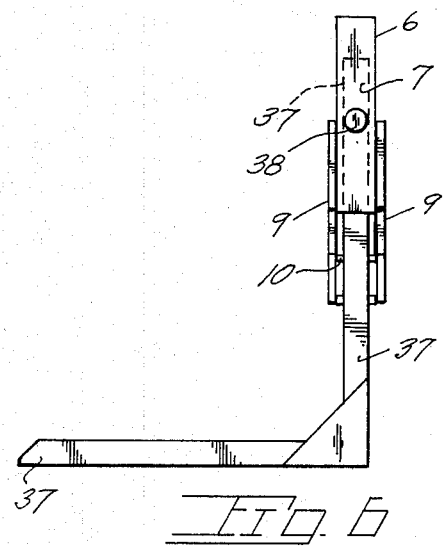

THREE POINT HITCH ADAPTOR FOR A TRACTOR

BACKGROUND OF THE INVENTION

The present invention relates generally to an adaptor for attachment to the three point hitch of a tractor to permit the coupling thereto of various implements having differently spaced apart attachment points.

Rear mounted tractor attachments such as plows, rakes, blades, etc., may vary in size and in the spacing of their hitch attachment points. Normally a tractor three point hitch is capable of engagement with but one arrangement of implement attachment points. Adaptor means are available to adapt a mismatched tractor and implement but are of limited use with an implement having certain attachment point spacing.

SUMMARY OF THE PRESENT INVENTION

The present invention is embodied within an adaptor for the three point hitch of a tractor which adaptor may support lift forks and has adjustable coupling means to accommodate various tractor mounted implements regardless of variances in coupling spacing.

The present adaptor includes a base member of box beam construction attachable to the lift arms and a top link typically constituting the three point hitch of a tractor. A wide array of implements are thereby adaptable to a tractor three point hitch.

The present adaptor is intended for attachment to a three point hitch with additional provision made for incorporating a tractor attached cylinder for imparting both powered lifting and lowering to the adaptor and the implement attached thereto. Adjustable coupling means are extensible so as to receive various implements having differently spaced apart attachment points. Similarly, additional coupling means are centrally disposed on the adaptor to receive an implement attachment point normally coupled to the top link of the three point hitch. Provision is made for insertably mounting of a pair of lift forks on the adaptor base member to provide a low cost lift fork tractor attachment. Further, provision is made for ball couplers on the adaptor for the reception of trailer tongue mounted sockets to facilitate use of the tractor in towing both regular and "fifth wheel" type trailers.

Objects of the present invention include the provision of a three point hitch adaptor enabling attachment of various types of ground working implements having a range of attachment point spacing; the provision of a three point hitch adaptor having both laterally and vertically adjustable coupling means; the provision of a three point hitch adaptor base member readily modified to insertably receive a pair of lift forks; the provision of a three point hitch adaptor capable of mounting ball coupling members at two different levels for the towing of conventional trailers as well as trailers having an elevated coupling location known as "fifth wheel" type trailers; the provision of a three point hitch adaptor including coupling means which includes locks biased into engagement with implement mounted attachment pins to confine said pin and implement against movement and to enable imparting downwardly directed forces to the implement; the provision of a three point hitch adaptor wherein locking means are remotely actuable to permit unlocking of the coupling means without the tractor operator leaving his station.

BRIEF DESCRIPTION OF THE DRAWING

In the accompanying drawing:

FIG. 1 is a perspective view of the present adaptor in place on a conventional three point tractor hitch with a detached implement shown in fragmentary phantom lines;

FIG. 2 is an enlarged rear elevational view of a portion of the adaptor disclosing coupling means thereon;

FIG. 3 is a side elevational view of FIG. 2;

FIG. 4 is a fragmentary rear elevational view of the adaptor with life forks in place; and FIG. 5 is a sectional view of the adaptor crossmember with a hitch ball in place thereon suitable for engagement with a "fifth wheel" type trailer coupling.

FIG. 6 is a right hand side elevational view of FIG. 4.

DETAILED DESCRIPTION OF THE PREFERRED EMBODIMENTS

With continuing attention to the drawing wherein reference numerals indicate parts similarly hereinafter identified, the reference numeral 1 indicates the rear wheels of a conventional tractor having a three point hitch mechanism at its rearward end comprising hitch arms 2 controlled by lift links 3 attached in turn at their upper unseen ends to the tractor's powered life arms, all in the conventional manner. The conventional three point hitch mechanism additionally includes an axially adjustable top link 4 secured at its forward end in a pivoted manner to the tractor.

Indicated generally at 5 is the present adaptor which is comprised of a base member of welded box beam construction having a horizontal crossmember 6 with tubular upright end members at 7 and 8 depending therefrom. The upright members are partitioned as at 7A and 8A. Secured to the upright members by means of gussets 9 are a pair of axially aligned horizontal tubular segments 10 receiving a removable lower transverse member 12 also of tubular construction. A ball hitch member is indicated at 13. In certain instances it may be desirable to remove member 12 to prevent interference with a power take-off shaft.

With attention to FIG. 3, it will be seen that the trailing end of three point hitch arms 2 are coupled to the adaptor base member by means of pins 14 extending through aligned apertures in said arms and in pairs of ears 15 secured to the forward and bottom surfaces of tubular segments 10. The upper end of the base member is attached to tractor top link 4 by means of a pin 16 (FIG. 1) passing through a top link end and a pair of ears as at 17 which ears are secured to coupling means including a post 18. A bolt 20 passes through one wall of crossmember 6 into locking abutment with post 18 to provide a means for locking the post at a desired height or to permit removal. A hook at 19 receives an attachment pin at 47 on an implement A-frame at A.

With attention to FIGS. 2 and 3 wherein additional coupling means are indicated generally at 22, the following description is equally applicable to both of the side mounted coupling means shown in FIG. 1. Said coupling means, later termed first coupling means, each includes an end plate 23 hook shaped at 24 for reception of an implement attachment pin 25 shown in phantom lines. The end plate of each coupling means is secured as by a weld at 26 to the end of an extensible support member 27 which member is insertable and lockable with the tubular segment 10 of the base member. Bolts at 30 and 31 are in threaded engagement respectively with tubular segment 10 and removable lower base member 12 and lockably abut against extensible support member 27. Coupling means 22 also includes a pivotally mounted lock 32 pivotally carried by a plate mounted pivot pin 33. The lock is urged toward a pin locking position by a spring 34 one end of which is retained within a plate recess 35. The outer end of said spring bears against the lock to position lock lower edge 32A over seated attachment pin 25 to confine same against upward movement. The lock additionally includes an arm 32B which additionally bears upon the attachment pin 25 with the distal end of the arm receiving a control 36 shown as a length of chain having a segment positioned for grasping by the seated tractor operator.

In FIG. 4 I show the coupling means removed from each tubular segment 10 and a pair of right angular lift forks 37 having upright portions inserted upwardly into upright base members 7 and 8 whereat locking pins 38 secure same in place. The partions 7A and 8A confine the inserted fork segments against shifting.

In FIG. 5, I show a sectional view of the base crossmember 6 with coupling means 18 in place. Top link 4 is coupled to ears 17 while cylinder mounting means is shown as a pair of ears 42 secured to the forward side of crossmember 6 the ears 42 serving to pivotally mount the rod end 43 of a piston rod 44 of a tractor supported hydraulic cylinder 45 (FIG. 1). The base end of cylinder 45 is pivotally mounted to a tractor hitch bar 46 extending rearwardly from the tractor chassis. With the adaptor in the configuration of FIG. 1, it will be seen that extension of piston rod 44 will impart lifting motion in parallelogram fashion to the adaptor while rod retraction provides powered lowering movement of the adaptor. Powered lowering of the adaptor, as opposed to lowering by gravity alone, is an important feature for the reason that a positive downward force may be imparted by cylinder 45 through the adaptor to the instrumentality thereon such as a scarifier or other ground working instrument. During cylinder actuation, tractor hydraulic controls positioning life links 3, and arms 2, are placed in a "float" position.

A "fifth wheel" or elevated ball hitch member at 48 is secured at the upper end of coupling means post 18.

In use, the adaptor is attached to the hitch arms and top link by means of pins 14 and 16 with coupling means 22 being thereafter spaced apart and locked to the base member with their spacing corresponding to the spacing of implement attachment pins as at 25 which will vary from implement to implement. The couling means at 18 will be adjusted vertically and thereafter locked by bolt 20 in order to receive the attachment pin 47 at the upper end of the implement A-frame A. Coupling is achieved by backing of the tractor so as to bring the coupling means locks 32 into biased engagement with the pair of implement attachment pins 25 whereafter lifting of the adaptor results in downward seating of said pins into coupling hooks 24. Lifting of the adaptor will cause A-frame pin 47 to seat downwardly within coupling means hook 19. Springs 34 urge coupling means locks 32 into overlying, locking abutment with attachment pins 25 to complete implement securement to the adaptor. Uncoupling of the implement is accomplished by the tractor operator tensioning chain 36 to retract locks 32 to permit upward discharge of attachment pins 25 from hooks 24 as the hitch arms are lowered relative the stationary implement at rest on the ground.

While I have shown a few embodiments of the invention it will be apparent to those skilled in the art that the invention may be embodied still otherwise without departing from the spirit and scope of the invention.

Having thus described the invention, what is desired to be secured under a Letters Patent is:

1. An adaptor for attachment to the three point hitch mechanism of a tractor enabling hitch support of various implements, said adaptor comprising, a base member including aligned tubular segments and adapted for coupling both to the hitch arms and top link of the three point hitch mechanism, and first coupling means carried within each of said segments at the opposite lower sides of said base member and extensible therefrom for adjustable locking engagement with an implement, second coupling means adjustably disposed centrally on said base member above the first mentioned coupling means for implement engagement, said first coupling means removably mounted in said tubular segments, said base member defining upright sockets, lift fork arms each having an upright portion adapted for mounting in a removable manner within one of said sockets, means for locking each lift fork portion to said base member.

2. The adaptor claimed in claim 1 wherein said second coupling means is vertically adjustable relative to the base member and includes a hook member for reception of a tractor attachment coupling pin, said second coupling means additionally including a ball hitch member.

* * * * *